July 28, 1970 — H. E. COOK — 3,521,780
TRUCK-MOUNTED LIFTING DEVICE
Filed Aug. 14, 1968 — 3 Sheets-Sheet 1

INVENTOR
HAROLD E. COOK,
By Knight & Rodgers
ATTORNEYS

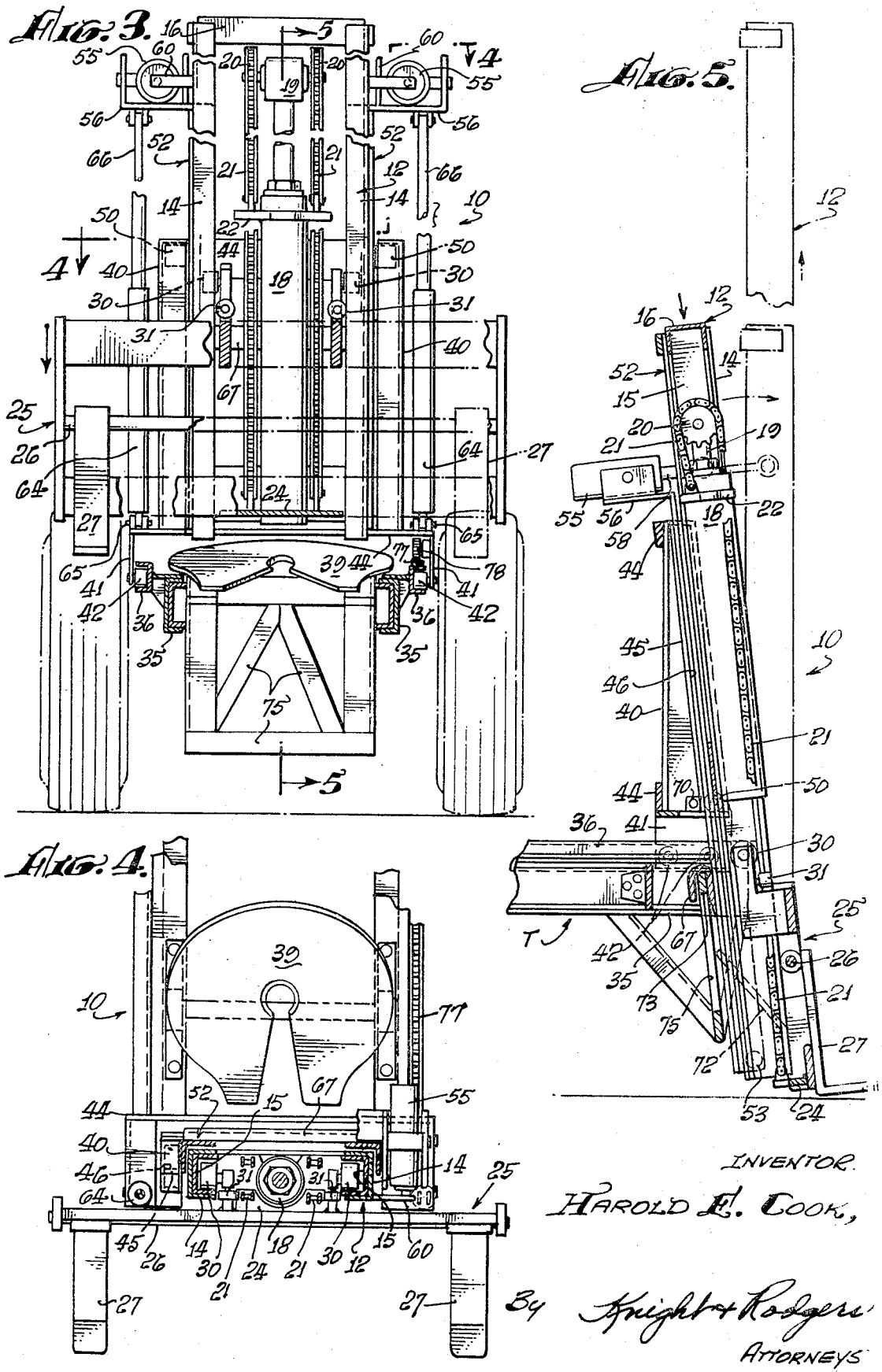

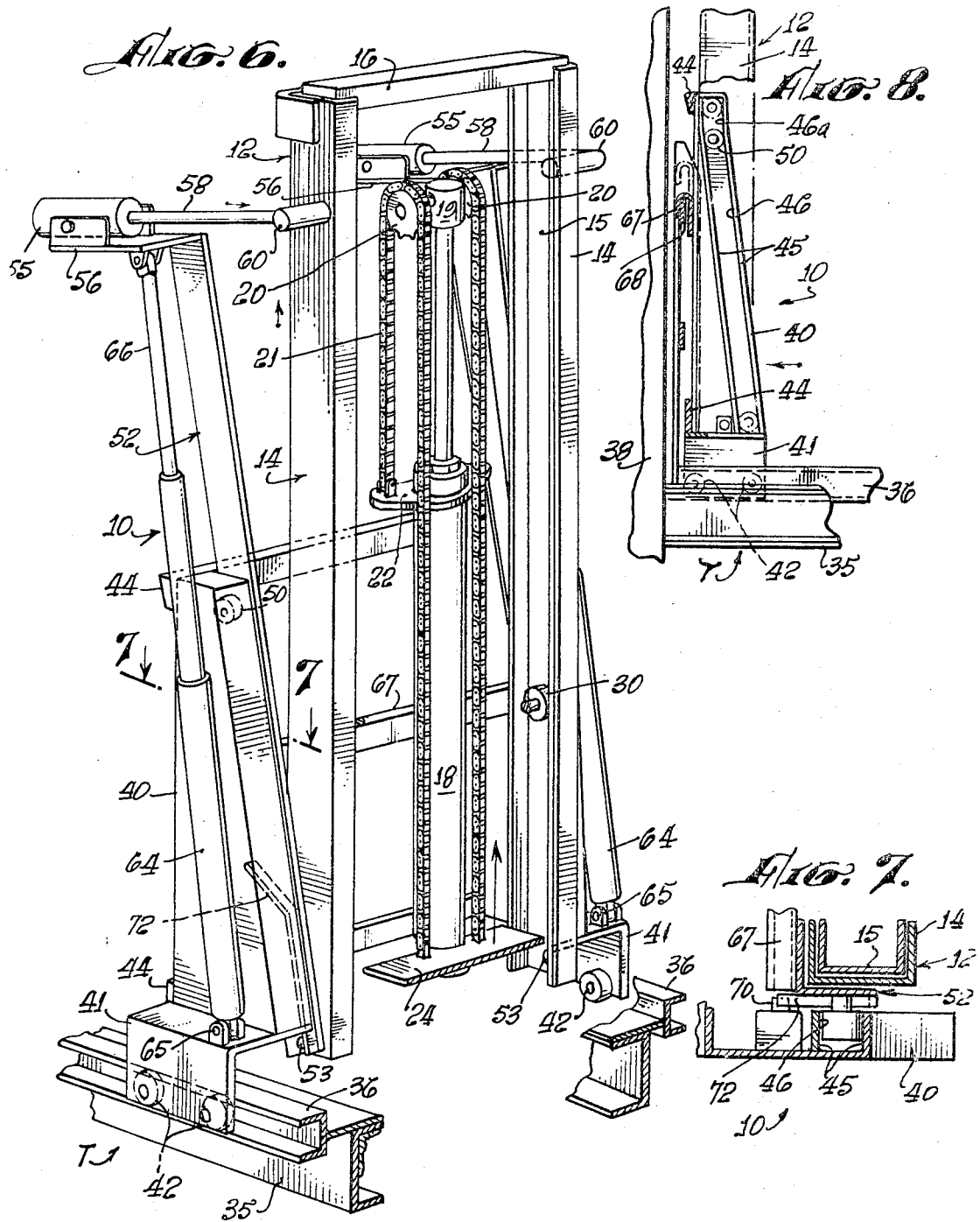

United States Patent Office 3,521,780
Patented July 28, 1970

3,521,780
TRUCK-MOUNTED LIFTING DEVICE
Harold E. Cook, P.O. Box 71, Bell, Calif. 90201
Filed Aug. 14, 1968, Ser. No. 752,516
Int. Cl. B65g 47/00
U.S. Cl. 214—674
6 Claims

ABSTRACT OF THE DISCLOSURE

A novel combination of a fork lift with a tractor for hauling semi-trailers is provided in which the fork lift is movable from a carrying position behind the cab to an operating position at the rear end of the trailer while keeping the mast of the fork lift in an upright position. The result is a simple, rugged construction which eliminates many of the complex motions and mechanisms characterizing earlier devices.

BACKGROUND OF THE INVENTION

The present invention relates generally to mobile lifting devices and more particularly to the combination of a fork lift with a tractor for trailers and/or semi-trailers and the like, which permits the fork lift to be easily and quickly stowed on the tractor in a carrying position.

The invention is also particularly concerned with tractors for trailers or semi-trailers in which the tractor is characterized by the provision of a fifth wheel connection between the tractor and the semi-trailer. This fifth wheel connection is a horizontal plate receiving a pin on the towed vehicle and providing an articulated connection between the tractor and the towed vehicle, as is well known in the art.

When cargo carrying vehicles, such as trailers or trucks, are loaded at a warehouse or depot, there is commonly available a lift truck for the purpose of loading the vehicles. The lift truck is particularly valuable when the cargo cannot be transferred from a loading dock or the like at substantially the level of the floor of the vehicle but instead must be raised from the ground to the level of the vehicle floor.

Many heavy, bulky materials are carried on trucks which require power equipment of some type for loading and unloading. The cargo handling problem becomes acute at the site where the materials are unloaded. This situation occurs frequently when transporting building materials to relatively remote building sites. In this case, the manual unloading of the heavy and bulky materials is costly and time consuming as well as perhaps dangerous. Manual unloading is particularly inappropriate in handling many articles, for example cement blocks and bricks which are loaded on the truck in a palletized condition to eliminate need for manually handling each block individually.

One solution of the problem developed in the past has been to tow a lift truck behind the trailer. This is unsatisfactory for various reasons. In the first place, lift trucks are not ordinarily made to travel on highways at highway speeds. Also, it keeps relatively valuable equipment inoperative while it is being moved from place to place.

Various designs of a lifting device mounted on and carried by a tractor have been devised as a solution to the problem, the lifting device thereby being mobile and also capable of serving to unload a towed trailer. However, many of these designs with which applicant is familiar have been unsatisfactory because they utilize a mast for the lifting forks that is lowered to a horizontal position when stowed on the tractor for carrying. This requires mechanism for erecting the mast when it is desired to lift objects, and such erecting mechanism has heretofore been objectionable as being too complex or structurally inadequate to perform the necessary operations.

When a lifting device, such as a fork lift, is mounted upon a tractor in order to render the lifting device mobile, it must be capable of being stored on the tractor for movement therewith; but the storage should not interfere with access to the fifth wheel. Ohterwise, the tractor is no longer available to tow a trailer, which is the primary purpose of the trailer. Also, the lifting device must be movable to an operative position at the rear end of the tractor where loads can be picked up.

Hence, it is a general object of the present invention to provide an improved and novel combination of fork lifting mechanism with a tractor which enables the tractor to operate as a lift truck but does not interfere with the operation of the fifth wheel on the tractor to tow a trailer.

It is a further object of the present invention to provide a combination of this character in which the mast carrying the lift forks can be moved from an operative or load lifting position to an inoperative or carrying position on the tractor without folding or lowering the mast to a horizontal position.

It is a further object of the present invention to provide a combination of a lift mechanism with a tractor which is simple in construction and design and reliable in operation.

SUMMARY OF THE INVENTION

The above and other objects of the present invention have been achieved by providing a fork lift having an upright mast, a fork, and means moving the fork vertically thereon with means for mounting the lift mechanism on horizontally extending frame members of an automotive vehicle in such a manner that the mast can be moved while in an upright position from an operating position at the rear of the tractor to a carrying position forwardly of the fifth wheel, passing over the fifth wheel while moving in either direction with the mast in an upright position.

This construction is characterized by track means mounted on the two horizontally extending frame members of the vehicle body. A carriage is mounted on the track means for movement along the vehicle body, the carriage being pivotally connected to the mast at the lower end of the mast. The carriage is provided with hydraulic means which tilts the mast relative to the carriage and with other hydraulic operating means which can lift the fork lift up on to the vehicle body to a position in which it can move forwardly passing over the fifth wheel.

The carriage comprises a pair of pedestals, one at either of two opposite sides of the tractor, and a pair of cooperating mast hangers which are movable up and down with respect to the pedestals. A latch member carried by the mast hangers engages a fixed keeper bar at the forward end of the tractor in order to lock the carriage in a position forwardly of the fifth wheel and behind the cab for carrying. The same latch member is also utilized to engage a cross member on the frame for transmitting loads directly to the frame without imposing these loads on the pedestals of the carriage.

BRIEF DESCRIPTION OF THE DRAWING

How the above objects and advantages of the present invention are achieved, as well as others not specifically mentioned herein, will be better understood by reference to the following description and to the annexed drawing, in which:

FIG. 3 is a rear end elevation of the tractor with the lift mechanism raised to the carrying position, as in FIG. 1;

FIG. 4 is a combined horizontal section and plan view on line 4—4 of FIG. 3;

FIG. 5 is a vertical section on line 5—5 of FIG. 3;

FIG. 6 is a fragmentary perspective of the fork lift and carriage, portions being broken away for simplicity of illustration;

FIG. 7 is a fragmentary horizontal section on line 7—7 of FIG. 6; and

FIG. 8 is a fragmentary section and elevation of a portion of the carriage for the fork lift.

DESCRIPTION OF A PREFERRED EMBODIMENT

Figure 1:
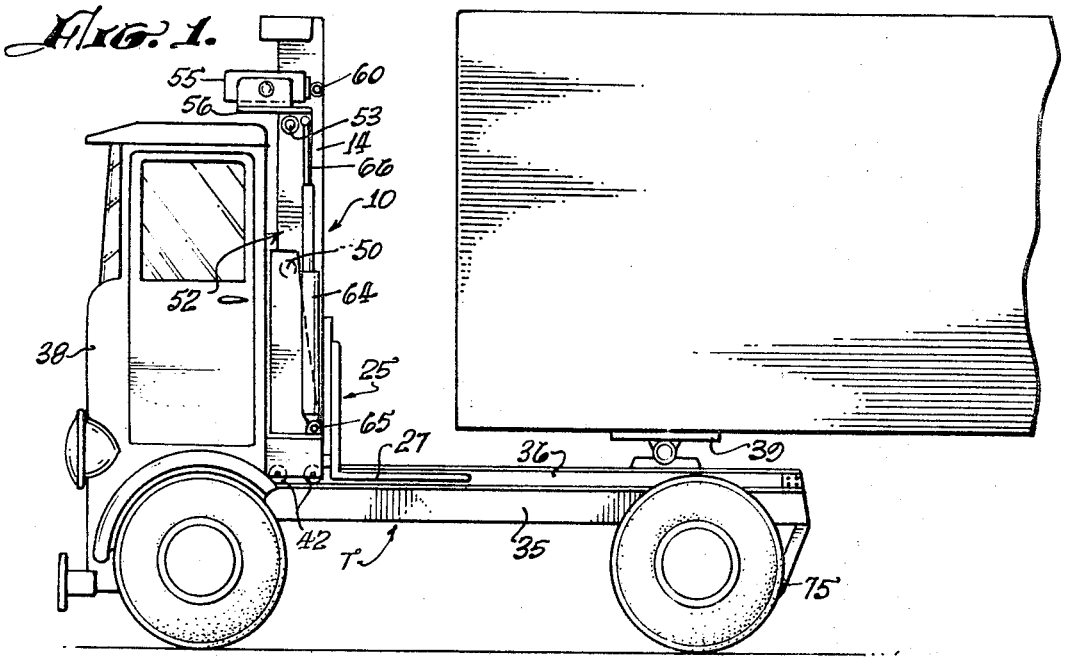
FIG. 1 is a side elevation of a tractor equipped with a lifting mechanism shown in the carrying position permitting the tractor to be connected to a semi-trailer.
Figure 2:
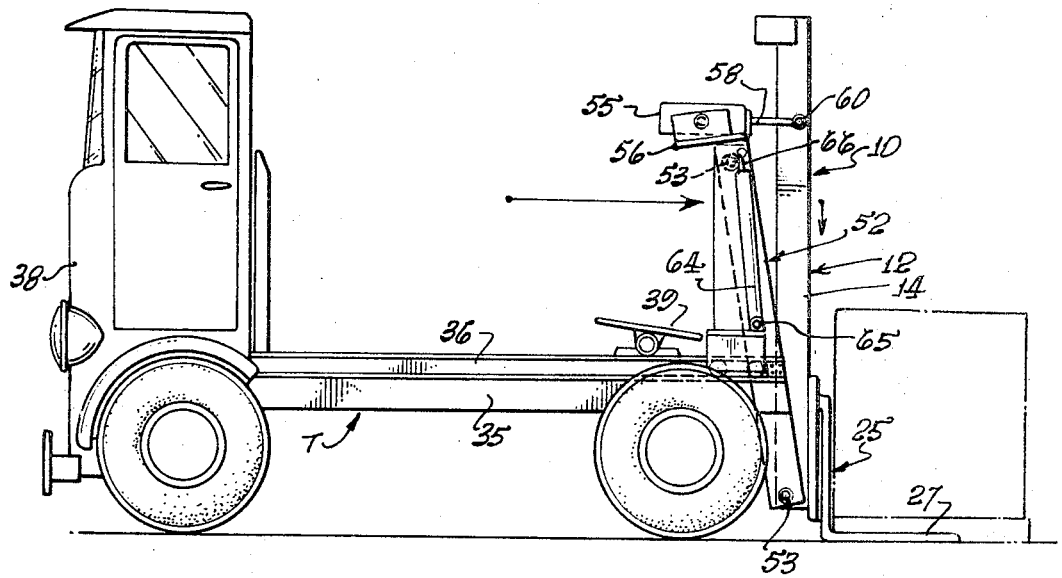
FIG. 2 is a side elevation of the tractor showing the lifting mechanism in operative position at the rear end of the tractor body.

Referring now to the drawing, it will be seen that the present invention provides a fork lift 10 and means for mounting the fork lift on a tractor T, or other automotive vehicle, for translation back and forth along the frame of the tractor. In FIG. 1, the fork lift is shown in the carrying position immediately behind the cab 38. In FIG. 2, the mechanism is shown in the operational position at the rear of the tractor frame, in which position the forks are able to be lowered to a position adjacent the ground level in order to pick up a load.

The fork lift indicated generally at 10 in FIGS. 3 and 6 may be of any suitable type. The particular lift mechanism herein illustrated is typical of various structures that have been developed for this purpose and is not limitative upon the invention. This fork lift comprises an upright mast 12 which is formed by two spaced pairs of nested, telescoping channels. The outer channel 14 in each pair remains relatively fixed when lifting a load, while the inner channel 15 of each pair can move upwardly, guided and held by the outer channel to extend the range of the fork lift beyond that which can be attained with only the outer channels 14 of any given height. The two inner channels 15 are connected at their upper ends by a cross member 16.

Lifting force for the forks and the load is provided by hydraulic cylinder 18 which extends upwardly between the two parallel sides of the mast and is supported by suitable connections to the framework of the fork lift 10 to which outer channels 14 are connected. Thus, cylinder 18 remains stationary during the lifting operations. Upward movement of the load is provided by plunger 19 which extends outwardly from and above the upper end of the cylinder 18 and which is raised by introducing hydraulic fluid under pressure into the lower end of cylinder 18. The source of fluid under pressure and the connections to the cylinder are not shown since these arrangements are well known in the art and any suitable apparatus may be employed for that purpose in the present design.

At the upper end of plunger 19, there is mounted a pair of sprockets 20 over which pass chains 21. One end of each chain 21 is anchored to fixed plate 22 fastened securely to the upper end of cylinder 18. From plate 22, the two chains 21 extend upwardly, each passing over one of sprockets 20, and then downwardly to a point of connection with bracket 24. Bracket 24 includes a plate that extends in a generally horizontal plane and, as may be seen particularly in FIG. 4, is connected to the rear face of the apron or buckboard indicated generally at 25. Apron 25 is moved vertically of the mast and is in the nature of an open framework that includes a horizontally extending rod 26 on which two forks 27 are slidably mounted. Forks 27 and apron 25 constitute the load-engaging portion of the fork lift and the spacing between forks 27 can be changed by movement along rod 26 in order to accommodate the forks to loads of different widths as well as to move the forks laterally on the apron to the point where they are located outwardly of and at opposite sides of the truck chassis, as will be further explained.

During vertical movement of apron 25 and forks 27, the apron is guided along mast 12 by a plurality of sets of guide rollers 30 and 31 which are attached to the apron at the rear face thereof in any suitable manner. Guide rollers 30 are located inside or between the parallel flanges of inner channel 15, as may be seen best in FIG. 4 to be guided by engagement with the inside face of the channel, while rollers 31 engage the inner edge of a channel flange to limit lateral movement of the apron. As the apron rises, the brackets carrying rollers 30 and 31 engage stops on channels 15 and carry them upwardly to extend the height of mast 12, thereby allowing the guide rollers to rise above the top of outer channels 14.

The fork lift 10 so far described is mounted upon the frame of the tractor T in a manner which now will be described. This frame of the tractor may be of any known or usual type; but, in general, the frame or chassis of the tractor comprises a pair of parallel, horizontally extending side frame members, as exemplified by channels 35 at opposite sides of the chassis. These side frame members provide a convenient support for a track provided by two rails 36 which are preferably channels and are mounted one at each side of the chassis upon frame members 35. Rails 36 extend horizontally parallel to each other, preferably extending longitudinally of the frame from substantially the rear side of cab 38 of the tractor to the back of the tractor frame. The two rails 36 are located one at each side of the fifth wheel 39 mounted on the chassis of the tractor and typically are located slightly below the top of the fifth wheel. As will become more fully apparent, these spaced rails 36 on the vehicle frame are part of the means for mounting the fork lift 10 on the chassis and enable the fork lift to move longitudinally of the chassis between the carrying position of FIG. 1 and the operative or load lifting position of FIG. 2.

The fork lift is mounted on rails 36 by a carriage that includes a pair of laterally spaced pedestals 40. At its base, each pedestal has a depending plate flange 41. On the inside face of each flange is a pair of supporting wheels 42 which are located in a channel 36, wheels 42 supporting the carriage for movement along the rails. The two pedestals 40 are interconnected by upper and lower cross members 44.

Each pedestal 40 is a box-like structure closed by a plate on the outside and open on the inner side, the open sides of the two pedestals facing inwardly toward each other. The open side of one pedestal is illustrated in FIG. 8 in which it will be seen that a pair of parallel bars 45 provide a guide 46 that is preferably inclined to the vertical by an angle of about 10°. Guide 46 is closed at its upper and lower ends and is designed to receive and guide the motion of roller 50 mounted on an exterior face of an upright mast hanger 52. The two hangers 52, one at each side of mast 12, are preferably structural angles, as shown in FIG. 4. One flange of each angle carries on its outer face guide roller 50. At the lower end of each mast hanger 52, the mast is pivotally connected thereto by pivot pin 53. This arrangement allows the mast to tilt in a vertical plane about a horizontal axis established by the two pivots 53, between the upright position of FIG. 6 and the tilted position of FIG. 5. This tilting motion of the mast away from the load is advantageously utilized when a carried load is being transported from one place to another by the tractor, as is well known in the art.

Tilting movement of the mast between the upright and inclined positions is controlled by a pair of hydraulic cylinders 55, located at opposite sides of the mast and pivotally carried on top of cylinder supporting platforms 56 mounted one each at the upper end of mast hangers 52. Each cylinder 55 has a forwardly extending plunger 58 which is connected at its outer or free end at 60 to an outer channel 14 of mast 12. Cylinders 55 are of the double-acting type whereby the plungers 58 and the upper end of mast 12 can be moved forwardly from the solid line position of FIG. 5 to the upright position of FIG. 5, or in the reverse direction by introducing hydraulic fluid under pressure through connections not shown in the drawing into one end or the other of cylinders 55.

The two mast hangers 52 are slidably mounted upon the carriage in order to be moved, together with the mast and other parts of the fork lift, between upper and lower positions. The upper position is shown in FIG. 6. The lower end of the mast is raised above chassis side members 36 and is high enough that all portions of the mast and carriage can pass over fifth wheel 39, permitting the entire fork lift and carriage assembly to be moved longitudinally of rails 36. On the other hand, when the hangers 52 and mast are lowered to the position shown in FIG. 2 and in FIG. 5, the mast is dropped to the point where forks 27 are proximate the ground level where they can pick up a load, particularly one on a pallet.

This vertical movement of the members 52 and the fork lift 10 is accomplished by a pair of hydraulic cylinders 64, disposed one at either side of the carriage. These cylinders are each pivotally connected at 65 at their lower end to the base of a pedestal. Each cylinder has an upwardly extending plunger 66 which is pivotally connected at its upper end to plate 56. These hydraulic cylinders are shown as being of the telescoping type in order to obtain a greater range of lift; but the invention is not necessarily limited thereto. By introducing hydraulic fluid under pressure to the lower ends of cylinders 64, hangers 52 and the fork lift supported thereby are raised from the lower position to the upper position; and by exhausting said hydraulic fluid, the weight of these elements allows the fork lift mechanism to drop to the load handling or operative position of FIG. 2.

The vertical movement of hangers 52 is directed in part by the two guide rollers 50 which move in guideways 46 in the two pedestals of the carriage. As shown in FIG. 8, the guideways each have a short, substantially vertical, section at their upper ends, as indicated at 46a. The purpose of this section is to provide for vertical movement of hangers 52 over a short range near the end of their vertical movement. This is utilized in order to lock the carriage in the carrying position of FIG. 1 in which the mast is raised and is forwardly on the chassis immediately behind the cab of the tractor.

This locking is accomplished by a U-shaped bar 67 which extends horizontally between the two hangers 52 and is fastened to them. This U-shaped member 67 is a latch adapted to engage a horizontally extending keeper bar 68 which is suitably mounted on the frame of the tractor or on the cab immediately to the rear of the cab. After the carriage is moved to the fully forward position of FIG. 1, by dropping hangers 52 and mast 12 from the extreme upper end of guideway 46, the straight vertical section 46a of the guide directs the U-shaped latch member 67 over fixed bar 68. Thereby, the carriage and all parts mounted on it are locked to the chassis against movement longitudinally of rails 36. The mast can be disengaged by reversing the motion to lift the U-shaped hook 67 clear of fixed bar 68. This movement of the latch 67 is accomplished by hydraulic cylinders 64.

Direction of the vertical movement of hangers 52 and the mast carried by them is also accomplished in part by a pair of fixed pins 70, each mounted on the inner side of a pedestal 40 and projecting inwardly beyond guideway bars 45, as shown particularly in FIG. 7.

On the outer face of each angle hanger 52, there is mounted a cooperating linear guide in the form of angular rib 72 which engages and slides over pin 70 as the hanger 52 is lowered. Guide rib 72 is angular, as shown in FIGS. 6 and 7, the lower portion being straight and substantially parallel to a vertical edge of an angle 52 and the upper portion of the rib being inclined upwardly and forwardly of the tractor.

As a consequence of this configuration of guide rib 72 as the two hangers 52 are lowered, they first move vertically down; but when pin 70 engages the inclined upper portion of slide 72, the lower end of the hangers 52 and of mast 12 is moved outwardly, that is rearwardly of and away from the tractor. The purpose of this movement is to carry the lower end of the mast to the rear of the end of the tractor chassis where it can drop down approximately to ground level. The hangers 52 can pivot about a horizontal axis established by the rollers 50 to permit the mast to tilt and bring about this rearward motion of the mast. At the bottom of this downward travel, the two hangers 52 supporting the mast are inclined upwardly and toward the front of the tractor, that is away from the load, by a suitable angle, normally approximately 10°, which is the angle of guideway 46. This is the position of the parts shown in full lines in FIG. 5.

As is shown particularly in FIGS. 3 and 5, there is attached to chassis members 36 a cross bar 73 which is engaged, at the bottom of the downward travel of slides 52, by the U-shaped latch 67. Thus, the live load carried on forks 27, as well as the dead load imposed by the weight of the elements of the fork lift are transferred directly through hangers 52 to the chassis elements of the tractor frame through the interengaging members 67 and 73. The sum of the live loads and the weight of the fork lift is not imposed upon pedestals 40 or the rails on which the mast rides back and forth along the tractor chassis. Accordingly, these elements may be of minimum strength. In order to reinforce bar 73 and give it added strength for the purpose of carrying this load, it may be stiffened by the addition of suitable braces, as shown at 75.

Raising and lowering of hangers 52 and the mast is accomplished by controlling inlet or exhaust of hydraulic fluid in cylinder 64. By introducing fluid, under pressure, the downward movements just described can be reversed, and the mast can be lifted from the operating position of FIG. 2 to a position as shown in FIGS. 3 or 6 in which the parts are elevated sufficiently to pass over the fifth wheel. They are then shifted forward to be stowed on the tractor for carrying, as shown in FIG. 1, and descibed previously.

Movement of the carriage and the fork lift longitudinally of the truck frame members can be accomplished by manually applied force. However, it is obviously advantageous to provide mechanical means for producing this motion. As an example of such means, there is shown in FIG. 3 rack 77 mounted on top of one of the side rails 36. Meshing with the teeth on rack 77 is drive pinion 78 mounted on flange 41 of a pedestal 40. The pinion can be rotated by an electric motor, not shown in the drawing, or by any other suitable prime mover. For example, a hydraulic motor can be used which receives hydraulic fluid under pressure from the same source that supplies hydraulic fluid to the several hydraulic cylinders. Rotation of pinion 78 shifts the carriage and the fork lift between the two positions of FIGS. 1 and 2.

A particular advantage of the present invention is that it can be made to a set of standard dimensions and still fit on most trucks and tractors, in contrast with earlier devices for the same purpose that were necessarily custom built to each model of vehicle on which the lift was to be mounted.

Another advantage is ease of installation. Since most trucks and tractors have the same frame width, the standard being 34 inches outside dimension, the mast and carriage can be made to standard sizes and the only parts requiring special design and attachment to the vehicle body on the rails 36. Installation is then completed by making the necessary hydraulic connections.

It will be appreciated that the invention is not necessarily limited to the detailed shapes and arrangements of the component parts of the structures illustrated herein; but rather various modifications may occur to persons skilled in the art without departing from the spirit and scope of the present invention. Accordingly, it is to be understood that the foregoing description is considered as being illustrative of, rather than limitative upon, the invention disclosed herein.

I claim:

1. A vehicle having a frame including a pair of horizontally extending frame members upon which is mounted a fifth wheel the combination therewith comprising: lift means including an upright mast, fork means movably mounted on said mast, means for moving the fork means vertically on said mast, carriage means mounted on said horizontally extending frame members for movement thereon relative to said frame members between selected locations forwardly of and rearwardly of said fifth wheel, said carriage means including a pair of first and second members, means pivotally mounting said upright mast at the lower end thereof to said second members, guide means including an inclined portion mounted on said first members for movably guiding said second members relative to said first members downwardly and outwardly beyond one end of said frame members, cooperating guide means mounted on said second members and operatively engaged with said guide means on said first members for guiding said second members, means for vertically moving said second members, the upright mast and fork means thereon from a first position in which the second members, upright mast and fork means thereon are at proximate ground level to a second position in which the second members, upright mast and fork means are located above said frame members, and means for locking said carriage means to said vehicle frame at a position forwardly of said fifth wheel.

2. The combination according to claim 1 in which fifth wheel with the mast in an upright position.

3. The combination according to claim 2 in which said frame includes a pair of transversely spaced rails supported on the horizontally extending frame members along which the carriage and the lift means travel when passing the lift means over the fifth wheel.

4. The combination as in claim 1 that also includes means connecting the carriage means to the vehicle frame in load transmitting relation with the mast in said operative position at the rear end of the frame.

5. The combination as in claim 1 that also includes hydraulic cylinder means connected between the carriage means and the mast to control the tilt angle of the mast relative to the vertical.

6. The combination as in claim 1 wherein the means for vertically moving said second members includes hydraulic cylinder means connected between said first and the lift means is constructed so that it can pass over the second members.

References Cited

UNITED STATES PATENTS

| 2,437,806 | 3/1948 | Dempster | 214—670 XR |
| 2,459,506 | 1/1949 | Dempster et al. | 298—22 |
| 3,054,522 | 9/1962 | Peck | 214—674 |
| 3,095,099 | 6/1963 | Costello | 214—77 |
| 3,240,008 | 3/1966 | McMullen | 214—670 XR |

GERALD M. FORLENZA, Primary Examiner

R. JOHNSON, Assistant Examiner

U.S. Cl. X.R.

214—75, 670